United States Patent

[11] 3,622,875

| | | |
|---|---|---|
| [72] | Inventor | Bunjiro Ichijo<br>Hamamatsu-shi, Japan |
| [21] | Appl. No. | 1,173 |
| [22] | Filed | Jan. 7, 1970 |
| [45] | Patented | Nov. 23, 1971 |
| [73] | Assignee | Kett Electric Laboratory<br>Tokyo, Japan |
| [32] | Priority | Apr. 21, 1969 |
| [33] | | Japan |
| [31] | | 44/29454 |

[54] DIELECTRIC CONSTANT-TYPE RESISTANCE-INSENSITIVE DIRECT-READING WATER CONTENT METER
1 Claim, 5 Drawing Figs.

[52] U.S. Cl. ................................................ 324/61 R
[51] Int. Cl. .................................................. G01r 27/26
[50] Field of Search ..................................... 324/60, 61

[56] References Cited
UNITED STATES PATENTS
2,852,739  9/1958  Hansen.......................... 324/61
2,939,077  5/1960  Branin, Jr. ..................... 324/61

*Primary Examiner*—Edward E. Kubasiewicz
*Attorney*—Hall, Pollock & Vande Sande

ABSTRACT: A dielectric constant-type resistance-insensitive direct-reading electrical apparatus for measuring water content wherein a measuring circuit coupled to a coil of a tank circuit in a high-frequency oscillator through a mutual induction coefficient $M_o$ comprises a series connection of a voltage pickup coil, a coil for taking out a detected voltage, a main coil and a first variable capacitor. A second variable capacitor $C_e$ is connected to the junction between the said coil for taking out a detected voltage and the main coil, and the respective values of $M_o$ and $C_e$, are suitably chosen to maintain a particular relation among the circuit constants so that a phase deviation of the detected voltage due to the connection of a test sample in parallel with the said first variable capacitor may be detected through a phase discriminator without the influence of the resistive component of the test sample.

PATENTED NOV 23 1971                3,622,875

INVENTOR
Bunjiro Ichijo

BY Hall, Pollock & VandeSande
ATTORNEYS

DIELECTRIC CONSTANT-TYPE RESISTANCE-INSENSITIVE DIRECT-READING WATER CONTENT METER

The present invention relates to a direct-reading water content meter of the dielectric constant, resistance-insensitive type.

What is most important in the characteristic of a dielectric constant type direct-reading electrical instrument for measuring water content is that the indication of the water content is not affected by the resistive component of a test sample, but corresponds only to the true variation in the dielectric constant due to the variation of water content of the said test sample and also that it produces a sufficient movement of the indicator in response to a small variation in the capacitance. The object of the present invention is, by satisfying the above-mentioned conditions, to provide circuit means, functioning as a dielectric constant type direct-reading electrical apparatus for measuring water content which is suitable for measuring materials possessing a comparatively large high-frequency loss and which has a wide range of application in industry.

The minimum equivalent parallel resistance of test samples reaches as low as 3 $\Omega$ and the measuring range of capacitance is about from $10^{1.7E'2}$ to $10^3$ pf. at 2 MHz. A stability of less than 0.5 $\mu$a. in terms of the zero drift was obtained during several hours operation. As stated above, the apparatus according to the present invention can completely accomplish the aforesaid object.

The above and other objects, features, and advantages of the present invention will be apparent from the following detailed description of a preferred embodiment thereof taken in conjunction with the accompanying drawings, in which.

Figure 1A:
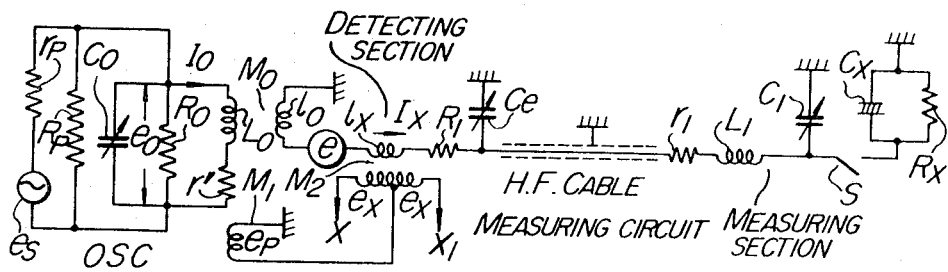
FIG. 1a is a circuit diagram of an example of a dielectric constant type direct-reading electrical apparatus for measuring water content suitable for working the present invention.
Figure 1B:
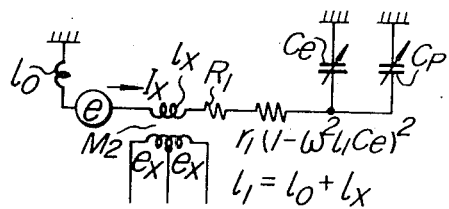
FIG. 1b shows an equivalent circuit of a measuring circuit of the complete circuit shown in FIG. 1a whereto test samples are to be connected in parallel with variable capacitors.

Referring to FIG. 1a, symbol OSC designates a high-frequency oscillator of a stable frequency, and symbols $L_o$ and $C_o$ represent an inductance and a capacitance forming a tank circuit. Symbol $r_p$ designated an internal resistance of a vacuum tube, and symbol $R_o$ an equivalent parallel resistance which represents a loss in the tank circuit, where the relation $R_o \ll r_p$ holds. A series of symbols $l_o$–$l_x$–$L_1$–$C_1$ denote components forming a series-tuning circuit, and a high-frequency coaxial cable is inserted between $l_x$ and $L_1$ so that a measuring section in the measuring circuit may be freely moved anywhere. Further, a variable capacitor $C_e$ is connected in parallel relation to the junction between $l_x$ and $L_1$, which also includes the distributed capacitance of the cable. FIG. 1b shows an equivalent circuit of a measuring circuit in the complete circuit shown in FIG. 1a, wherein $C_p$ is given by:

$$C_p = \frac{C_1}{1-\omega^2 L_1 C_1} \qquad (1)$$

where $\omega$ is the angular frequency of the OSC.

When the circuit is tuned by adjusting the values of $C_1$, namely $C_p$, and $C_e$, a high-frequency current $I_x$ flowing through the measuring circuit shown in FIG. 1b is given by:

$$I_x = \frac{e}{R_1 + r_1(1-\omega^2 l_1 C_e)^2} \qquad (2)$$

where, symbol $e$ designated a voltage supplied to the measuring circuit, symbol $R_1$ a resistance for coils in the detecting section, and symbol $r_1$ a resistance of the measuring section. Accordingly:

$$e_x = \omega M_2 I_x = \frac{\omega M_2 e}{R_1 + r_1(1-\omega^2 l_1 C_e)^2} \qquad (3)$$

If a high-frequency current flowing through $L_o$ of the tank circuit in OSC is designated by $I_o$, an electromotive force $e$ induced in the measuring circuit is expressed by $e = \omega M_o I_o$, and also the relation $e_0 = \omega L_o I_o$, hence $I_0 = e_0/\omega L_o$ holds, provided $\omega L_o$ $r'$, where, $$r' = \frac{\omega^2 M_0^2}{R_1 + r_1(1-\omega^2 l_1 C_e)^2}$$

and $M_o$ is a mutual inductance coefficient between $l_o$ and $L_o$. If $r'$ is converted to a resistance $R_p$ which is connected in parallel with $L_o$ and $C_o$, $R_p$ is expressed by:

$$Rp = \frac{\omega^2 L_0^2}{r'} = \frac{L_0^2}{M_0^2}\{R_1 + r_1(1-\omega^2 l_1 C_e)^2\} \qquad (4)$$

If an equivalent parallel resistance of the tank circuit is designated by $R_o$, and provided $R_o$ $R_p$, $e_o$ is expressed by:

$$e_0 = e_s \times \frac{1}{1+r_p/R_p} \qquad (5)$$

Substituting the expression (4) for $R_p$ in the above expression (5), we obtain:

$$e_o = e_s x \frac{L_0^2\{R_1+r_1(1-\omega^2 l_1 C_e)^2\}}{L_0^2\{R_1+r_1(1-\omega^2 l_1 C_e)^2\}+M_0^2 r_p} \qquad (5)$$

$$I_0 = \frac{e_0}{\omega L_0} = \frac{L_0\{R_1+r_1(1-\omega^2 l_1 C_e)^2\}\cdot e_s}{\omega[L_0^2\{R_1+r_1(1-\omega^2 l_1 C_e)^2\}+M_0^2 r_p]}$$

$$e_p = \omega M_1 I_0 = \frac{M_1 L_0\{R_1+r_1(1-\omega^2 l_1 C_e)^2\}\cdot e_s}{L_0^2\{R_1+r_1(1-\omega^2 l_1 C_e)^2\}+M_0^2 r_p} \qquad (6)$$

$$e = \omega M_0 I_0 = \frac{M_0 L_0\{R_1+r_1(1-\omega^2 l_1 C_e)^2\}\cdot e_s}{L_0^2\{R_1+r_1(1-\omega^2 l_1 C_e)^2\}+M_0^2 r_p} \qquad (7)$$

$$e_x = \frac{\omega M_2 M_0 L_0 e_s}{L_0^2\{R_1+r_1(1-\omega^2 l_1 C_e)^2\}+M_0^2 r_p} \qquad (8)$$

Suppose now that the values of $M_o$ and $C_e$ are suitably adjusted to satisfy the following relation:

$$M_0^2 r_p \gg L_0^2 \; R_1+r_1(1-\omega^2 l_1 C_e)^2 \qquad (9)$$

Then;

$$r_p \gg \frac{L_0^2}{M_0^2}\{R_1+r_1(1-\omega^2 l_1 C_e)^2\}$$

The comparison of the above expression with the expression (4) results in $r_p \gg R_p$. At the same time, due to the above relation, the expression 8) may be simplified as:

$$e_x = \omega M_2 L_0 e_s / M_0 r_p \qquad (8)'$$

The expression (8)' shows that $r_l$ has no relation to $e_x$. Also, the expression 6) may be simplified as:

$$e_p = M_1 L_0 \; R_1+r_1(1-\omega^2 L_1 C_e)^2 \cdot e_s/M_0^2 r_p \qquad (6')$$

Figure 2:
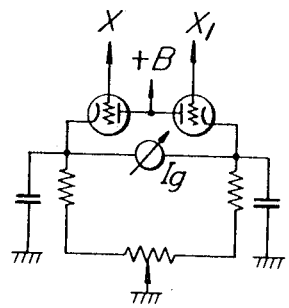
FIG. 2 is a schematic circuit diagram of a detector or a phase discriminator for detecting and indicating a phase deviation of the detected voltage.
Figure 3A:
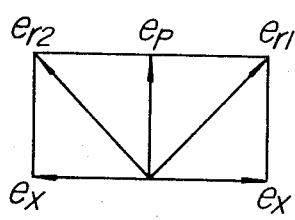
FIG. 3a is a vector diagram showing the phase relation of input voltage to the phase discriminator when a test sample is not connected to the measuring circuit.
Figure 3B:
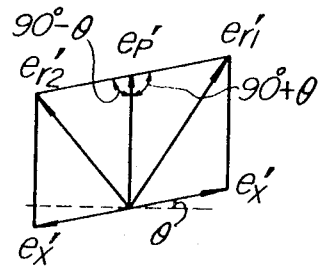
FIG. 3b is a vector diagram showing the phase relation of the input voltages to the phase discriminator when a test samples has been connected to the measuring circuit.

Since a phase difference of 90° exists between $e_p$ and $e_x$ and $e_p$ is applied to a center tap of a secondary coil of a transformer which produces $e_x$, when the detector or the phase discriminator shown in FIG. 2 has a square-law characteristic, and if $\theta$ designates a phase angle deviation of $e_x$ due to $\Delta C_p$, an output current $I_y$ of the phase discriminator is given by:

$$I_y = 4K e_x e_p \tan\theta \qquad (10)$$

where, $K$ is a detection constant, and $\tan\theta$ is given by $$\tan\theta = \frac{\Delta C_p}{\omega(C_e+C_p)^2\{R_1+r_1(1-\omega^2 l_1 C_e)^2\}}$$

From the expression (1), $\Delta C_p$ is expressed as:
$$\Delta c_p = \Delta C_1/(1-\omega^2 L_1 C_1)^2$$
Hence, the phase deviation of $e_x$ due to a small variation $\Delta C_1$ in $C_1$ becomes:

$$\tan\theta = \frac{\Delta C_1}{\omega(C_e+C_p)^2\{R_1+r_1(1-\omega^2 l_1 C_e)^2\}} \times \frac{1}{(1-\omega^2 L_1 C_1)^2} \quad (11)$$

Substituting $C_p$ in the expression (1) for $C_p$ in the above expression (11), we obtain:

$$\tan\theta$$
$$= \frac{\Delta C_1}{\omega\left(C_e + \frac{C_1}{1-\omega^2 L_1 C_1}\right)^2 \{R_1+r_1(1-\omega^2 l_1 C_e)^2\}} \times \frac{1}{(1-\omega^2 L_1 C_1)^2}$$

$$= \frac{\Delta C_1}{\omega C_1^2 \left\{1+\frac{C_e}{C_1}(1-\omega^2 L_1 C_1)\right\}^2 \{R_1+r_1(1-\omega^2 l_1 C_e)^2\}}$$

$$\omega^2 l_1\left(C_e + \frac{C_1}{1-\omega^2 L_1 C_1}\right) = 1$$

From the above expression, the following expression can be derived:

$$1 + \frac{C_e}{C_1}(1-\omega^2 L_1 C_1) = \frac{1}{1-\omega^2 l_1 C_e}$$

Therefore, the expression of $\tan\theta$ may be transformed to:

$$\tan\theta = \frac{(1-\omega^2 l C_e)^2 \cdot \Delta C_1}{\omega C^2 1\{R_1+r_1(1-\omega^2 l 1 C_e)^2\}} \quad (12)$$

Substituting the expressions (6)', (8)', and (12) into the expression (10) which represents the output current $I_g$, we obtain:

$$I_g = 4K \cdot \frac{M_1 M_2 L^2 o_e^2 s(1-\omega^2 l_1 C_e)^2 \cdot \Delta C_1}{C^2_1 M^3 o r^2_p} \quad (13)$$

The expression (13) teaches us that the output current $I_g$ is in direct proportion to the capacitance variation $\Delta C_1$ and has no relation to the term which represents the loss in the tuning circuit. In FIG. 1a, when $C_x$ and $R_x$ which represent a test sample are connected by closing a switch $S$, the indicator of the phase discriminator produces a movement corresponding to $I_g = \alpha C_x$, which indication has no relation to the amount of $R_x$. Thus, it will be understood that the above-described apparatus can be used as a direct-reading capacity meter which is not influenced by the resistive component of a test sample as indicated by expression (13), when the circuit parameters $M_o$ and $C_e$ are adjusted to satisfy the condition shown in equation (9). In the case of practical measurement, the series resistance $r_x$, which is equivalent to the resistance $R_x$ of the test sample connected in parallel with the variable capacitor $C_1$, is represented as $r_x = 1/\omega^2 C_1^2 R_x$. Therefore the total resistance $r_t$ of the measuring section is given by $r_t = r_1 + r_x$, so it is necessary to substitute $r_t$ for $r_1$ in the conditional expression (9).

What is claimed is:

1. A dielectric constant type resistance-insensitive direct-reading meter for measuring the water content in a test sample comprising:

a high-frequency oscillator of angular frequency $\omega$ having a source internal resistance $r_p$, said oscillator including a tank circuit having a coil of self-inductance $L_o$;

a measuring circuit including a detecting section and a measuring section connected to one another, said detecting section comprising a first voltage pickup coil having a self-inductance $l_o$, which first pickup coil is coupled to coil $L_o$ of said tank circuit through a mutual induction $M_o$, a transformer primary coil having a self-inductance $l_x$ connected in series with coil $l_o$, and a variable capacitor having a capacitance $C_e$ connected in parallel with said series connected elements $l_o$ and $l_x$, said measuring section comprising a main coil and a variable capacitor to be connected in parallel with the test sample; and a phase discriminator including a secondary coil of said transformer connected to a second voltage pickup coil for monitoring phase deviations in voltages detected through said transformer due to the connection of the test sample to said measuring section;

the respective values of $M_o$ and $C_e$ satisfying the condition $$r_p \gg \frac{L_o^2}{M_o^2}\{R_1+r_t(1-\omega^2 l_1 C_e)^2\}$$

where, $R_1$ represents the series resistance of the coils in said detecting section, $r_t$ represents the series resistance of said measuring section, and $l_1$ is the sum of $l_o$ and $l_x$.

* * * * *